United States Patent
Tebano et al.

(10) Patent No.: US 10,328,755 B2
(45) Date of Patent: *Jun. 25, 2019

(54) METHOD AND SYSTEM FOR ESTIMATING THE LOAD ACTING ON A TIRE

(75) Inventors: Riccardo Tebano, Milan (IT); Giorgio Audisio, Milan (IT); Anna Paola Fioravanti, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 1084 days.

This patent is subject to a terminal disclaimer.

(21) Appl. No.: 13/993,362

(22) PCT Filed: Dec. 21, 2011

(86) PCT No.: PCT/IB2011/003151
§ 371 (c)(1),
(2), (4) Date: Jun. 12, 2013

(87) PCT Pub. No.: WO2012/085655
PCT Pub. Date: Jun. 28, 2012

(65) Prior Publication Data
US 2013/0261991 A1    Oct. 3, 2013

Related U.S. Application Data

(60) Provisional application No. 61/467,128, filed on Mar. 24, 2011.

(30) Foreign Application Priority Data

Dec. 23, 2010 (IT) .............................. MI2010A2384

(51) Int. Cl.
B60C 23/06 (2006.01)

(52) U.S. Cl.
CPC ............ *B60C 23/06* (2013.01); *B60C 23/064* (2013.01)

(58) Field of Classification Search
CPC .............................. B60C 23/06; B60C 23/064
(Continued)

(56) References Cited

U.S. PATENT DOCUMENTS

| | | |
|---|---|---|
| 5,801,305 A | 9/1998 | Kawai et al. |
| 6,060,984 A | 5/2000 | Braun et al. |

(Continued)

FOREIGN PATENT DOCUMENTS

| | | |
|---|---|---|
| CN | 101001763 A | 7/2007 |
| CN | 101124469 A | 2/2008 |

(Continued)

OTHER PUBLICATIONS

Holscher et al., "Modeling of Pneumatic Tires by a Finite Element Model for the Development a Tire Friction Remote Sensor", Preprint submitted to Computers and Structures, Oct. 28, 2004.*

(Continued)

*Primary Examiner* — Mohamed Charioui
*Assistant Examiner* — Catherine T. Rastovski
(74) *Attorney, Agent, or Firm* — Finnegan, Henderson, Farabow, Garrett & Dunner, L.L.P.

(57) ABSTRACT

A method and system for estimating the load acting on a tire, wherein data are obtained, representative of the deformation undergone by the tire on a rolling surface. The data obtained are processed in order to obtain a first quantity representative of the deformation extent within a first deformation region substantially corresponding to the footprint between the tire and the rolling surface and a second quantity, different from the first quantity, representative of the deformation extent in a second deformation region, the second region including the first deformation region and having a circumferential extension greater than the circumferential extension of the first deformation region, the second quantity being obtained starting from at least a part of the (Continued)

obtained data, which corresponds to a portion of the second deformation region which is external to the footprint. The load is estimated based on the first quantity and the second quantity thus obtained.

22 Claims, 5 Drawing Sheets

(58) Field of Classification Search
USPC .......................................................... 702/41
See application file for complete search history.

(56) References Cited

U.S. PATENT DOCUMENTS

| | | | |
|---|---|---|---|
| 6,729,179 | B2 | 5/2004 | Crema et al. |
| 8,833,151 | B2* | 9/2014 | Tebano .................. B60C 23/06 |
| | | | 73/146 |
| 2003/0005764 | A1* | 1/2003 | Colarelli, III ....... G01M 17/022 |
| | | | 73/462 |
| 2007/0171034 | A1 | 7/2007 | Mancosu et al. |
| 2007/0240501 | A1 | 10/2007 | Mancosu et al. |
| 2007/0240502 | A1 | 10/2007 | Morinaga et al. |
| 2007/0255510 | A1* | 11/2007 | Mancosu ................ B60T 8/172 |
| | | | 702/34 |
| 2008/0302177 | A1* | 12/2008 | Sinnett .................. B60C 23/064 |
| | | | 73/146 |
| 2012/0211997 | A1 | 8/2012 | Bonisoli et al. |
| 2013/0211741 | A1 | 8/2013 | Tebano et al. |
| 2013/0261991 | A1 | 10/2013 | Tebano et al. |
| 2013/0263655 | A1 | 10/2013 | Tebano et al. |
| 2014/0005956 | A1* | 1/2014 | Patel ....................... B60C 23/04 |
| | | | 702/41 |

FOREIGN PATENT DOCUMENTS

| | | |
|---|---|---|
| DE | 10 2006 028 412 | 12/2007 |
| EP | 1 293 362 | 3/2003 |
| EP | 1 757 464 A1 | 2/2007 |
| WO | WO 2012/085649 | 6/2012 |

OTHER PUBLICATIONS

Hölscher, H. et al., "Modeling of Pneumatic Tires by a Finite Element for the Development a Tire Friction Remote Sensor," Center of Advanced European Studies and Research (caesar), Ludwig-Erhard-Allee 2, 53175 Bonn, Germany, Preprint submitted to Computers and Structures, pp. 1-17, (2004).

International Search Report from the European Patent Office for International Application No. PCT/IB2011/003151, mailed Jul. 17, 2012.

Notification of the First Office Action dated Apr. 3, 2015 from the Patent Office of the People's Republic of China in corresponding Chinese Patent Application No. 201180060029.3.

USPTO Office Action issued in U.S. Appl. No. 13/994,302 dated Feb. 4, 2014, 8 pages.

* cited by examiner

METHOD AND SYSTEM FOR ESTIMATING THE LOAD ACTING ON A TIRE

CROSS REFERENCE TO RELATED APPLICATIONS

This application is a national phase application based on PCT/IB2011/003151, filed Dec. 21, 2011, which claims the priority of Italian Patent Application No. MI2010A002384, filed Dec. 23, 2010, and the benefit of U.S. Provisional Application No. 61/467,128, filed Mar. 24, 2011, the content of each application being incorporated herein by reference.

BACKGROUND OF THE INVENTION

Field of the Invention

The invention relates to a method and a system for estimating the load acting on a tire.

Description of the Related Art

Incorporating electronic monitoring devices within tires is becoming increasingly important in order to increase the vehicle safety.

Such devices may, for example, include sensors and other components adapted to obtain information relating to various quantities of a tire such as for example, temperature, pressure, acceleration, number of tire revolutions, vehicle speed, load acting on the tire and the like.

H. Holscher at al. ("Modeling of Pneumatic Tires by a Finite Element Model for the Development a Tire Friction Remote Sensor", preprint submitted to Computers and Structures, pages 1-17, 28 Oct. 2004) describe a tire curvature sensor for determining the actual load of a tire for a given pressure or for determining whether the pressure of a tire is correct for the actual load.

The Applicant faced the technical problem of determining the load acting on a tire without the need of explicitly knowing the tire inflation pressure.

This in order to eliminate the need of having a direct pressure sensor within a tire monitoring device and obtaining advantages in terms of reduction of the number of sensors used by the monitoring device and, thus, of the costs, overall dimensions and energy consumption of the monitoring device.

A pressure sensor of the direct type is typically provided with a membrane exposed to the air, which involves problems of assembly, strength and reliability of the monitoring device.

Therefore, elimination of such a sensor also allows simplifying the assembly of the monitoring device and providing a sealed, strong and reliable monitoring device.

SUMMARY OF THE INVENTION

The Applicant observed that, in general, a tire on a rolling surface undergoes a deformation by the effect of the load acting on the tire and due to the fact that the tire is made of elastically deformable material.

The Applicant observed that the tire gets deformed at a first deformation region, substantially corresponding to the footprint, and at a second circumferentially wider deformation region, comprising the first region.

The Applicant found that from data representative of the tire deformation it is possible to obtain two different quantities, respectively representative of the deformation extent in the first region and of the deformation extent in the second region, which both depend on the load acting on the tire and which, in different load and inflation pressure conditions, are (although correlated) not directly proportional to one another.

The Applicant found that starting from said quantities it is possible to estimate the load acting on the tire and that such estimate may advantageously be carried out without the need of explicitly knowing the tire inflation pressure.

In a first aspect thereof, the present invention therefore relates to a method for estimating the load acting on a tire, said method comprising:

obtaining data representative of the deformation undergone by the tire on a rolling surface;

processing the obtained data in order to obtain a first quantity $\beta$ representative of the deformation extent within a first deformation region substantially corresponding to the footprint between the tire and the rolling surface and a second quantity $\sigma$, different from the first quantity, representative of the deformation extent in a second deformation region, said second region comprising the first deformation region and having a circumferential extension greater than the circumferential extension of the first deformation region, the second quantity $\sigma$ being obtained starting from at least a part of the obtained data, which corresponds to a portion of said second deformation region which is external to the footprint;

estimating the load on the basis of the first quantity $\beta$ and the second quantity $\sigma$ thus obtained.

In a second aspect thereof, the present invention also relates to a system for estimating the load acting on a tire, said system comprising at least one processing unit adapted to:

obtain data representative of the deformation undergone by the tire on a rolling surface;

to process the obtained data in order to obtain a first, quantity $\beta$ representative of the deformation extent within a first deformation region substantially corresponding to the footprint between the tire and the rolling surface and a second quantity $\sigma$, different from the first quantity, representative of the deformation extent in a second deformation region, said second region comprising the first deformation region and having a circumferential extension greater than the circumferential extension of the first deformation region, the second quantity $\sigma$ being obtained starting from at least a part of the obtained data, which corresponds to a portion of said second deformation region which is external to the footprint;

estimate the load on the basis of the first quantity $\beta$ and the second quantity $\sigma$ thus obtained.

In the present description and following claims:

the expression "load acting on a tire" is used for indicating a force acting on a tire perpendicularly to the rolling surface;

the expression "crown portion" of a tire is used to indicate a portion of the tire that extends between the sidewalls of the same according to a lateral direction of the tire;

the expression "quantities $\beta$ and $\sigma$ not directly proportional to one another" is used for indicating that $\beta \neq k^* \sigma$, where k is a constant;

the terms "lateral" and "laterally" are used for indicating quantities measured in a direction parallel to the axis of rotation of the tire;

the terms "radial" and "radially" are used for indicating quantities measured in a direction perpendicular to the axis of rotation of the tire;

the terms "longitudinal", "longitudinally", "circumferential" and "circumferentially" are used for indicating quantities measured tangentially to the tire and perpendicularly to the lateral direction.

The present invention, in at least one of the above aspects thereof, can exhibit at least one of the following preferred features.

In an embodiment, the first quantity β is representative of the circumferential extension of said first deformation region.

In another embodiment, the first quantity β is representative of a change of position undergone within the footprint by a prefixed crown portion, with respect to a predetermined point of reference.

In an embodiment, the second quantity σ is representative of the circumferential extension of said second deformation region.

The data representative of said deformation may be selected from the group comprising: data representative of an acceleration component to which a prefixed crown portion is subjected, data representative of a speed component of a prefixed crown portion and data representative of a change of position of a prefixed crown portion with respect to a predetermined point of reference.

Advantageously, the data representative of the deformation are obtained by causing rotation of the tire on the rolling surface.

In an embodiment, the system for estimating the load acting on the tire also comprises the tire.

Advantageously, the system also comprises a monitoring device operatively associated with the tire, said monitoring device being adapted to obtain data representative of said deformation.

The monitoring device is advantageously devoid of a direct pressure sensor.

In an embodiment, the monitoring device comprises an accelerometer fixed on a crown portion of the tire.

Advantageously, the data representative of said deformation are obtained by said accelerometer.

In an embodiment, the monitoring device comprises a sensor adapted to determine the position of a prefixed crown portion with respect to a predetermined point of reference.

Advantageously, the data representative of said deformation are obtained by said position sensor.

Further features and advantages of the present invention will appear more clearly from the following description of some exemplary embodiments of the same, made by way of indicative and non-limiting examples only, description that shall be made with reference to the annexed drawings, wherein:

DETAILED DESCRIPTION OF THE INVENTION

Figure 1:
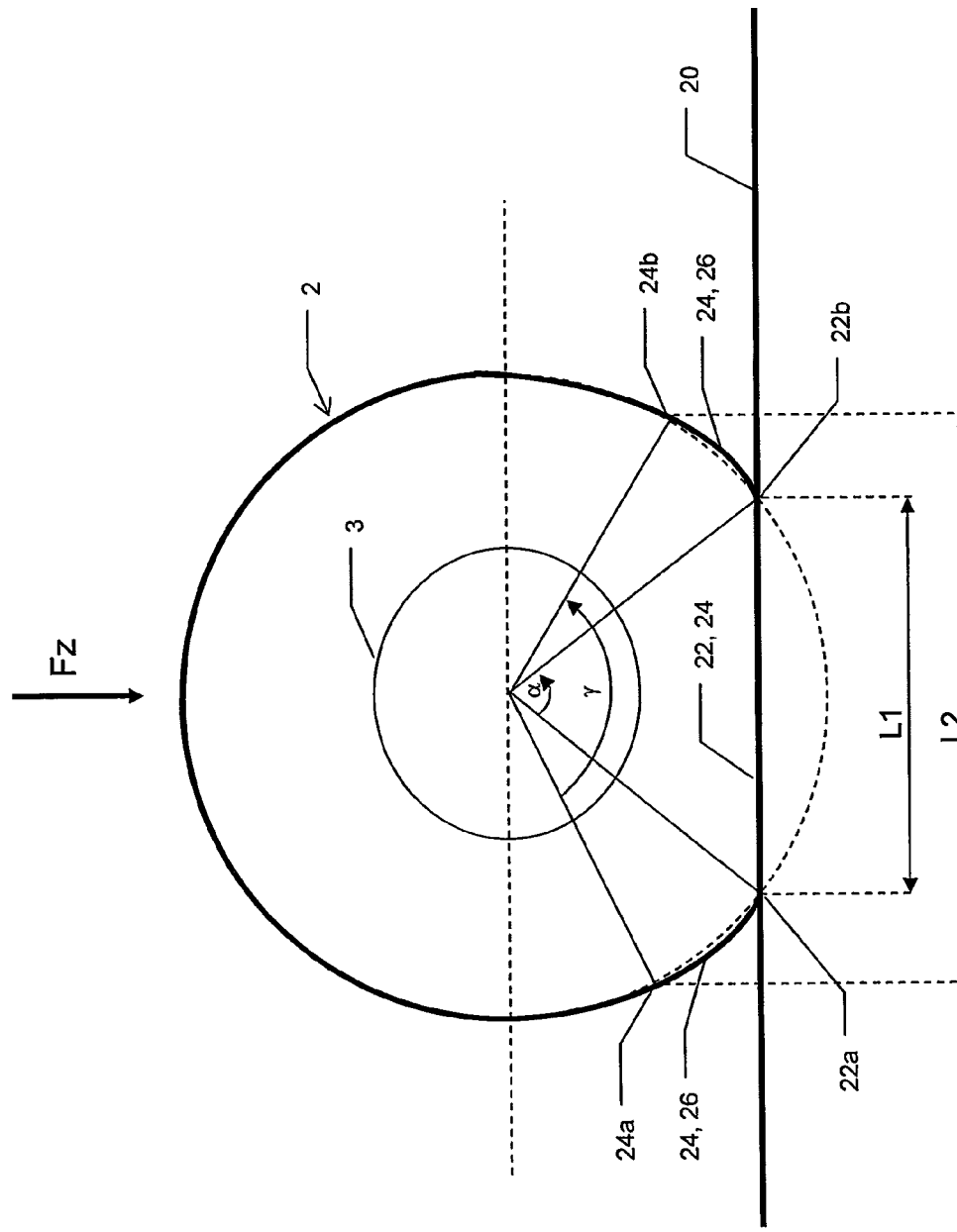
FIG. 1 schematically shows a deformed tire.

FIG. 1 schematically shows a tire 2 on a rolling surface 20 (for example a road surface).

Tire 2 is mounted on a rim 3 and may be mounted on any type of vehicles (not shown), such as for example cars, vehicles designed for good transport, such as trucks or lorries, etc.

By virtue of the load acting on the tire (for example, once it has been mounted on a vehicle) and of the fact that tire 2 is made of elastically deformable material, tire 2 undergoes a deformation.

In FIG. 1, the load is represented by arrow Fz perpendicular to the rolling surface 20.

As schematically shown in FIG. 1, such deformation affects a circumferential region 24 of tire 2, defined between two circumferential ends 24a, 24b, wherein the tire shape differs from a substantially circular shape (shown with a dashed line in FIG. 1).

The circumferential region 24 is positioned in a lower portion of tire 2 facing the rolling surface 20.

The circumferential region 24 comprises the footprint 22, defined between two circumferential ends 22a, 22b, and two regions 26 external to the footprint 22, respectively defined between two circumferential ends 24a, 22a and 22b, 24b.

The Applicant observed that from data representative of the deformation undergone by the tire it is possible to determine two deformation regions: a first deformation region substantially corresponding to the footprint 22 and a second circumferentially wider deformation region comprising the footprint 22, corresponding to at least a portion of the circumferential region 24.

The Applicant further found that from data representative of the deformation undergone by the tire it is possible to obtain two different quantities β and σ, respectively representative of the deformation extent within the first deformation region and of the deformation extent within the second deformation region, which both depend on the inflation pressure of tire 2 and on the load acting on tire 2 and which, in different load and inflation pressure conditions, are (although correlated) not directly proportional to one another.

In particular, the Applicant found that the two quantities β and σ are not directly proportional to one another when the second quantity σ is obtained starting from at least a part of the data representative of the deformation which corresponds to a portion of the second deformation region which is external to the footprint 22.

Starting from these observations, the Applicant found that the load acting on the tire may be estimated based on the two quantities β and σ and that such estimate may advantageously be carried out without the need of knowing the tire inflation pressure.

The Applicant notes that quantities β and σ may represent the extent of the deformation in terms, for example, of circumferential extension of the first and of the second deformation region.

For example, the circumferential extension may be determined in terms of angular extension (see, for example, angles α and γ of FIG. 1), in terms of subtended chord length (see, for example, lengths L1 and L2 of FIG. 1) or in terms of length taken along the circumferential tire profile. Angle α may be comprised between 5° and 40° whereas angle γ shall typically be less than or equal to 180°.

Quantities β and σ may represent the deformation extent also in terms of change of position (determined with respect to a non deformed tire) undergone, within one of the two regions, by a prefixed crown portion of tire 2, with respect to a predetermined point of reference.

For example, the change of position may be determined in terms of change of radial distance between the prefixed crown portion to the centre of the tire, with respect to a non deformed tire.

The data representative of the deformation undergone by tire 2 may be obtained during the rolling of tire 2 by a suitable sensor.

Such sensor may for example be an accelerometer or a position sensor.

The position sensor may be an optical or magnetic device adapted to determine the position of a prefixed crown portion with respect to a predetermined point of reference (such as, for example, the radial distance between the crown portion and the tire centre, or a prefixed point of the rim whereon the tire is mounted), during the rolling of the tire.

Figure 7:
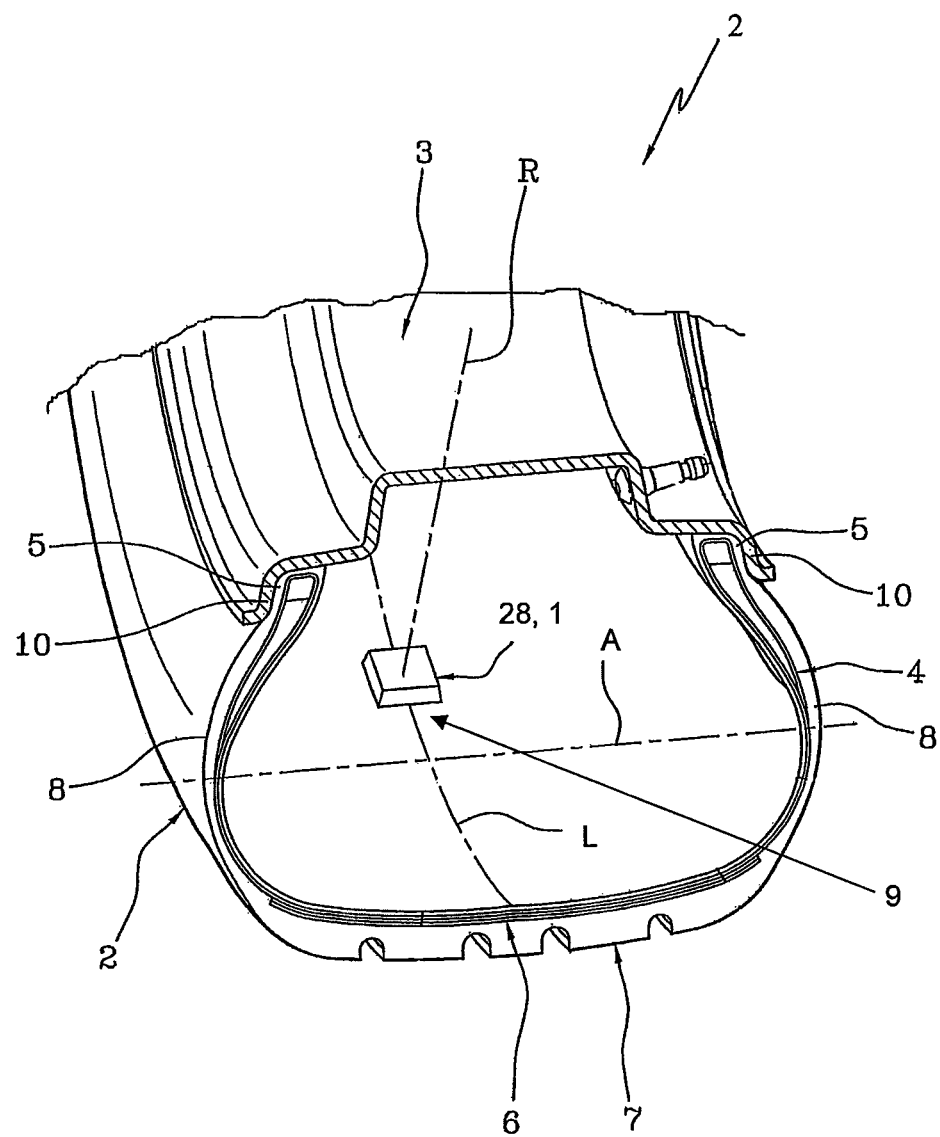
FIG. 7 schematically shows a tire portion comprising a monitoring device.

FIG. 7 shows a portion of a tire 2 that may be used in a system for estimating the load acting on a tire according to the present invention.

Tire 2 comprises a monitoring device 28 which in turn comprises said sensor, indicated with reference number 1.

In FIG. 7, reference letters "R", "L" and "A" indicate a radial direction, a longitudinal direction (also called tangential or circumferential) and a lateral direction (also called axial) of the tire, respectively.

Tire 2 is mounted on a rim 3. It may be mounted on any type of vehicles, such as for example cars, vehicles designed for good transport, such as trucks or lorries, etc.

Tire 2 is preferably arranged for being used on vehicles provided with electronic devices installed on board, adapted to cooperate and interact with the monitoring device 28.

Tire 2 comprises a carcass structure 4, not shown in detail, shaped according to a substantially toroidal configuration and engaged, through the opposite circumferential edges thereof, to two annular anchoring structures (usually identified by the name of "bead cores"), each one whereof is arranged in a region 5 usually identified by the name of "bead".

A belt structure 6 comprising one or more belt strips is applied onto the carcass structure 4, in a circumferentially outer position.

On the belt structure 6, in a circumferentially outer position, there is a tread band 7 on which longitudinal and/or transversal recesses are typically formed, arranged to define a desired tread pattern.

Tire 2 also comprises a pair of so-called sidewalls 8 applied laterally on opposite sides of the carcass structure 4.

Reference number 9 indicates a crown portion of tire 2 that extends between sidewalls 8, according to a lateral direction of the tire.

The inner surface of the tire is typically coated with a sealing layer, or so-called "liner", comprising one or more layers of elastomeric material that is impermeable to air, adapted to ensure the hermetic seal of the tire itself.

Advantageously, as shown in FIG. 7, the monitoring device 28 is fixed at a crown portion 9, preferably on the liner of tire 2, by a suitable fastening element (not shown).

Preferably, the monitoring device 28 is arranged substantially at the equatorial plane of tire 2.

The fastening element is advantageously adapted to conform to the deformations undergone by the structure of the tire during rolling, in order to keep the fastening of the monitoring device 28 to the liner stable over time.

Advantageously, besides sensor 1, the monitoring device 28 may also comprise other sensors (not shown) adapted to measure physical quantities of interest of the tire, such as for example the temperature.

Thanks to the invention, the monitoring device 28 may advantageously be devoid of a direct pressure sensor.

Advantageously, the monitoring device 28 also comprises a radio-frequency transmitter (not shown).

The radio-frequency transmitter is adapted to transmit, through an antenna (not shown), data relating to the physical quantities measured, to a receiver (not shown) external to tire 2.

The receiver may be located on the vehicle whereon the tire is mounted.

The data coming from sensor 1 are advantageously processed (optionally with initial filtering and/or conversion to digital form) by at least one processing unit (that is, one or more processing units), which may be comprised within the monitoring device 28 and/or the receiver external to tire 2, so as to determine the load acting on the tire.

Said at least one processing unit comprises hardware and/or software modules adapted to implement the method for estimating the load acting on the tire according to the invention.

In particular, such modules are advantageously adapted to process the data representative of the deformation coming from sensor 1 so as to obtain quantities β and σ and to estimate the load acting on the tire based on such quantities.

For example, if sensor 1 comprises a triaxial accelerometer, quantities β and σ may be obtained by processing:

data representative of at least one between radial component and longitudinal component of the acceleration measured by the accelerometer;

data representative of at least one between radial component and longitudinal component of the speed of a prefixed crown portion during at least one tire revolution, obtainable by processing (for example, integrating) the signal measured by the accelerometer; and/or data representative of the change, during at least one tire revolution, of at least one between radial and longitudinal position of a prefixed crown portion with respect to the tire centre or other predetermined point of reference, also obtainable by processing (for example, integrating twice) the signal measured by the accelerometer, or by a position sensor.

Figure 2:
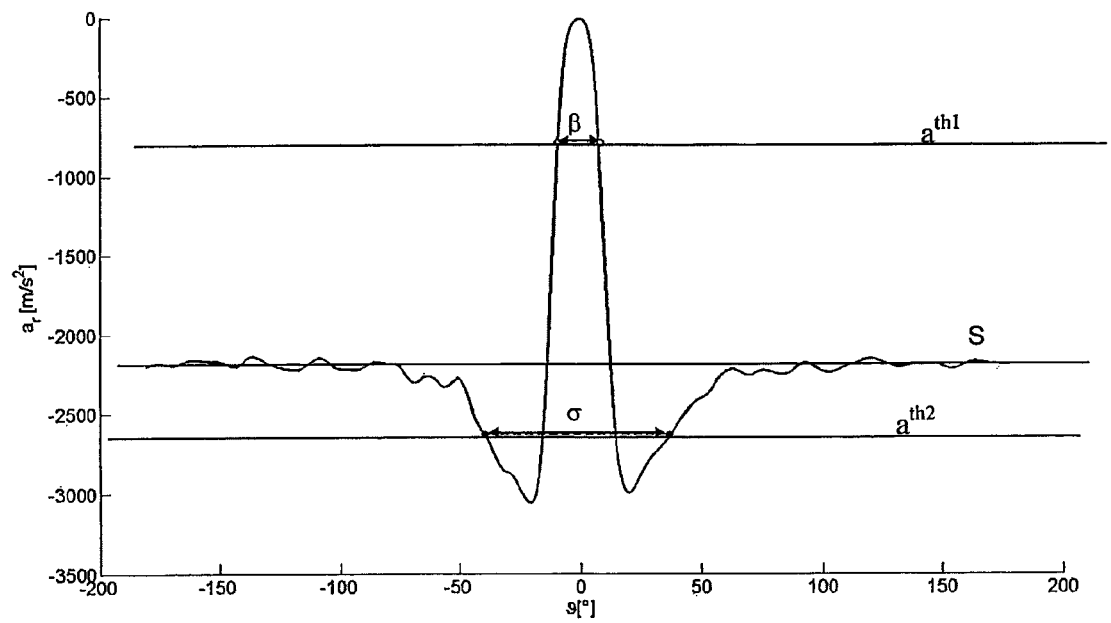
FIG. 2 shows a curve representative of an example of acceleration radial component to which a prefixed crown portion is subjected during at least one tire revolution.

By way of an example, FIG. 2 shows an example of acceleration radial component obtained, during one tire revolution, by filtering the signal measured by an accelerometer mounted on a tire crown portion (on the liner, substantially at the equatorial plane), as a function of the angular position of the accelerometer with respect to the footprint centre (θ=0 indicates an angular position of the accelerometer at the footprint centre, θ>0 indicates angular positions after the footprint centre, θ<0 indicates angular positions before the footprint centre, θ=±180° indicates an angular position of the accelerometer diametrically opposite the footprint centre).

The curve refers to a tire sold under the trademark PZERO ROSSO™, and in particular a 225/50R17 tire manufactured by the Applicant, mounted on the front right wheel of a vehicle sold under the trademark ALFA ROMEO™, ALFA 159™ travelling in a straight direction at a speed of 60 km/h on dry asphalt.

Figure 4:
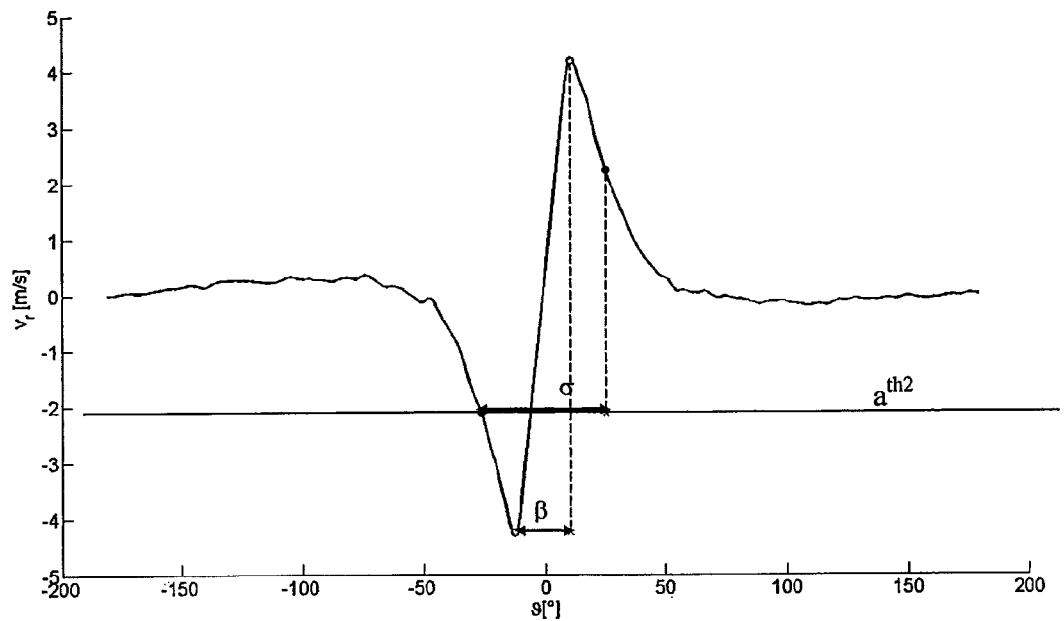
FIG. 4 shows a curve representative of an example of speed radial component of a prefixed crown portion during at least one tire revolution.
Figure 5:
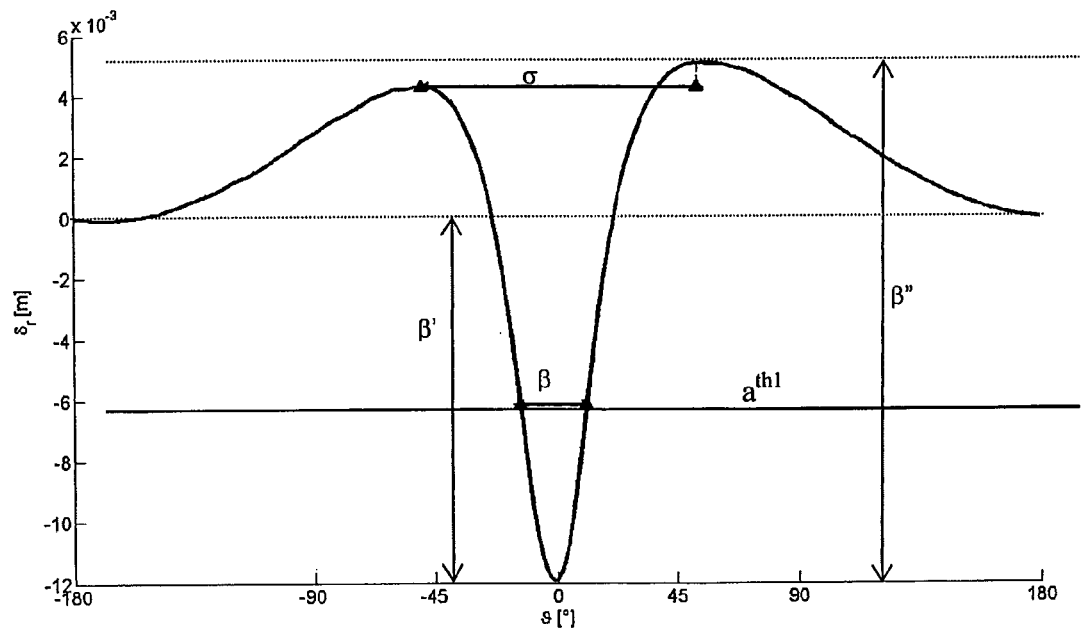
FIG. 5 shows a curve representative of an example of position change, according to a radial direction of the tire, to which a prefixed crown portion is subjected with respect to the tire centre, during at least one tire revolution.
Figure 6:
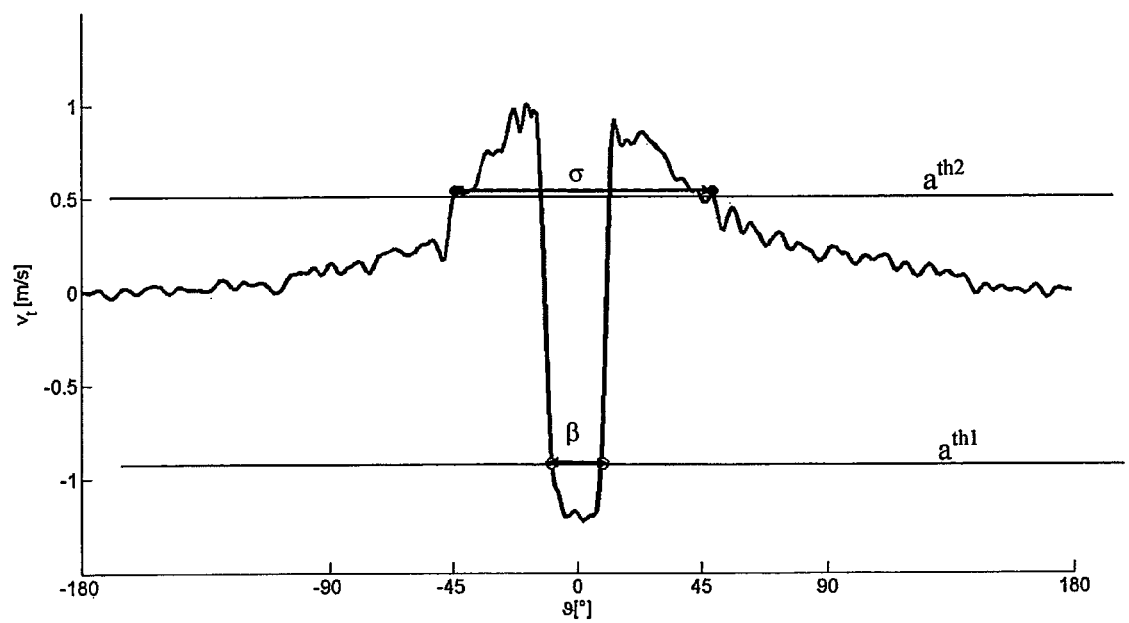
FIG. 6 shows a curve representative of a speed tangential component of a prefixed crown portion during at least one tire revolution.

In turn, FIGS. 4-6 respectively show examples of: a curve of speed radial component of a prefixed crown portion during at least one tire revolution, obtained by integrating the curve of FIG. 2; a curve of radial position change of a prefixed crown portion with respect to the tire centre during at least one tire revolution, obtained by integrating the curve of FIG. 4; and a curve of a speed tangential component (that is, longitudinal) of a prefixed crown portion during at least one tire revolution, obtained by processing the tangential acceleration component measured by accelerometer 1. Also the curves in FIGS. 4-6 are represented as a function of the angular position θ of the accelerometer with respect to the footprint centre. In FIG. 5, the change of radial position is provided with respect to the radial position taken by the prefixed crown portion in a non deformed tire region (the change of position therefore is null at a large distance from the footprint, for example in the top half of the tire, facing the vehicle).

As may be seen, all the curves of FIGS. 2, 4-6 exhibit a region with an almost constant pattern and a region with variable pattern. The region with almost constant pattern corresponds to the situation in which the accelerometer (and the crown portion on which it is positioned) is very far from the footprint, where the tire is substantially non deformed. The region with variable pattern corresponds to the situation in which the accelerometer approaches, enters, passes through, exits and moves away from the footprint. Such region substantially corresponds to the circumferential region (see FIG. 1) wherein the tire undergoes the deformation due to the contact with the rolling surface and to the deflection imparted by the load.

The curves of FIGS. 2, 4-6 therefore are representative of the tire deformation.

Starting from such curves, quantities β and σ may for example be determined as angular extensions of a first region, substantially corresponding to footprint 22, and of a second wider region comprising footprint 22 (corresponding to at least one portion of the circumferential region 24). The first region will be typically comprised between the angular positions −20° and +20° whereas the second region will be typically comprised between the angular positions −90° and +90°. In practice, such quantities β and σ may be obtained by setting suitable thresholds (selected so as to determine the first and the second region) and calculating the distance between the angles at which the curves cross the set thresholds.

Examples of quantities β and σ and of thresholds $a^{th2}$, $a^{th1}$ are shown in FIGS. 2, 4-6.

In particular, as shown in FIG. 2, in the case of radial acceleration curve, threshold $a^{th1}$ may be a fraction of a value of the acceleration radial component away from the footprint (which is about equal to the centrifugal tire acceleration and is indicated in the figure with a reference line S) whereas threshold $a^{th2}$ may be a greater value than that of the acceleration radial component away from the footprint and in any case less than the maximum (in absolute value) reached by the acceleration radial component. For example, threshold $a^{th2}$ may be calculated as prefixed fraction of the maximum (in absolute value) reached by the radial acceleration. As an alternative to the two thresholds it is also possible to use a single threshold (for example, equal to threshold $a^{th2}$ shown in FIG. 2). In that case, quantity β may be determined as angular distance between the two innermost points wherein the curve crosses threshold $a^{th2}$ whereas quantity σ may be determined as angular distance between the two outer points wherein the curve crosses threshold $a^{th2}$.

In the case of the radial speed curve of FIG. 4, quantity β may advantageously be determined as angular distance between the minimum value and the maximum value of the curve, whereas quantity σ may be determined using a threshold $a^{th2}$ that may be, for example, a predefined fraction of the minimum value or the maximum value of the curve.

In the case of the curve of FIG. 5, threshold $a^{th1}$ to be used for calculating quantity β may be equal to a fraction (for example ½) of the maximum (in absolute value) of the curve.

In turn, quantity σ may be determined as angular distance between the two local maximums of the curve on the right and on the left of the footprint centre.

In the case of the curve of FIG. 6, considerations similar to those made for FIG. 2 apply.

As said above, besides the angular extension, quantities β and σ may represent the extent of the tire deformation also in terms of change of position (for example, according to a radial direction) undergone by a prefixed crown portion of tire 2 with respect to a predetermined point of reference (for example, the tire centre), during at least one tire revolution.

This is shown, for example, in FIG. 5 wherein it is shown that the quantity representative of the deformation extent within footprint 22 may also be obtained by determining (in absolute value) the maximum of change of position (indicated in FIG. 5 with symbol β') or the distance between a local maximum and minimum of the curve (indicated in FIG. 5 with symbol β").

Moreover, in the case of the curve of FIG. 2, it is noted that quantity β may be represented by a parameter correlated with the transition steepness of the acceleration radial component curve at the inlet and/or outlet from the footprint. The transition steepness of the acceleration radial component curve is described in detail in the Italian patent application No. MI2010A001789 (filed by the same Applicant and incorporated herein by reference).

According to a variant, instead of using suitable thresholds, one or both quantities β and σ may be determined by an interpolation procedure that uses a parametric function of the type $$f = f(\theta | p_1 \ldots p_n)$$

where θ represents the angular position θ of the crown portion during a complete tire revolution and $p_1 \ldots p_n$ are parameters at least one of which is β and/or σ.

According to the interpolation procedure, revolution after revolution, the values of the parameters $p_1 \ldots p_n$ of the interpolation function are determined (for example by implementing an algorithm of the least squares) that enable to better approximate, through such an interpolation function, the data representative of the deformation of the tire.

Figure 3:
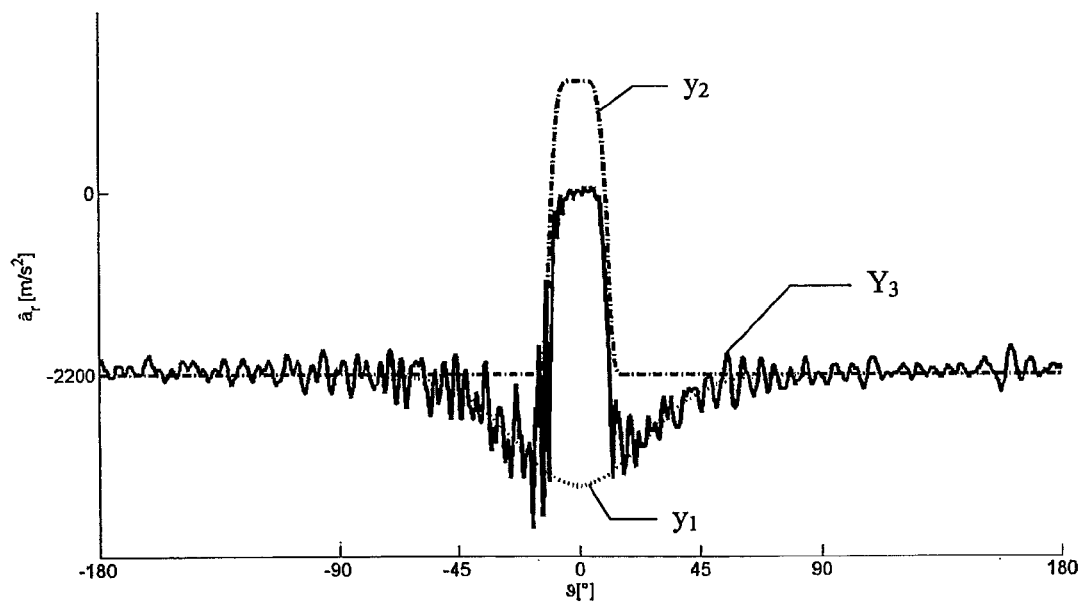
FIG. 3 shows two curves representative of two interpolation functions that may be used for determining quantities β and σ shown in FIG. 2.

For example, when the data representative of the deformation are obtained from the acceleration radial component measured by the accelerometer and quantities β and σ represent the angular extensions shown in FIG. 2, the following interpolation functions may be used:

$$y_1(\vartheta | \sigma) \approx e^{-\frac{\vartheta^2}{2\sigma^2}}$$

$$y_2(\vartheta | \nu, \beta) \approx e^{-|\beta\vartheta|^\nu}$$

where, as shown in FIG. 3, $y_1$ is a function with Gaussian pattern whereas $y_2$ is a function with exponential pattern of a power of the angular position θ, which takes an almost zero value outside the footprint (defined by β). The interpolation procedure allows finding the values of β and σ which, by the above functions $y_1$ and $y_2$, provide the best approximation of the data obtained by the sensor (shown in FIG. 3 by curve $Y_3$).

It is noted that advantageously, the data obtained by the accelerometer may be normalized according to a normalization procedure.

Considering that the acceleration is typically related to the electrical signal provided by accelerometer 1 (for example, voltage V) by means of a relation of the type:

$$a = GV + V_{offset}$$

where G is the gain and $V_{offset}$ the offset, the normalization may advantageously be carried out so as to make the acceleration (or speed, or change of position) values independent of the offset (by a subtraction operation) and of the gain (by a division operation) of accelerometer 1.

This is very advantageous because it prevents having to perform laborious calibration operations of the accelerometer.

Once quantities β and σ have been determined, load Fz acting on the tire may be estimated by a Fourier development, or by a combination (for example, linear or preferably, quadratic) of quantities β and σ. An example of quadratic combination is as follows:

$$F_z = b_{11} + b_{12}\sigma + b_{13}\beta + b_{14}\sigma\beta + b_{15}\sigma^2 + b_{16}\beta^2 \quad (1)$$

Advantageously, considering that quantities β and σ are also correlated with the tire inflation pressure, they may also be used for estimating the inflation pressure p carrying out a Fourier development, that is, carrying out a combination (for example, linear or preferably, quadratic) of quantities β and σ. An example of quadratic combination is as follows:

$$p = b_{21} + b_{22}\sigma + b_{23}\beta + b_{24}\sigma\beta + b_{25}\sigma^2 + b_{26}\beta^2 \quad (2)$$

Coefficients $b_{ij}$ can be determined once, for each given tire specification, so as to best reproduce known reference values.

For example, coefficients $b_{ij}$ may be obtained by:
determining (experimentally or by numerical simulations) a plurality of pairs of values of β and σ at a plurality of known pressure and load conditions, and
determining, by an interpolation procedure (for example, implementing a least squares algorithm), the values of parameters $b_{ij}$ that enable to best approximate, by the above functions (1) and (2), the plurality of known conditions of pressure, load and quantities β and α.

The Applicant implemented such procedure by FEA (Finite Element Analysis) simulations on a Pirelli P7 tire with dimensions 225/50 R17, sold under the trademark CINTURATO™, and obtained the following values of parameters $b_{ij}$:

$b_{11}=2017$
$b_{12}=2263$
$b_{13}=1497$
$b_{14}=-1219$
$b_{15}=4706$
$b_{16}=3024$
$b_{21}=-2.37$
$b_{22}=-8.08$
$b_{23}=13.23$
$b_{24}=-54.95$
$b_{25}=30.62$
$b_{26}=37.75$ for 25 different combinations of the following load and pressure values:
$F_z$=170, 337, 505, 675, 1015 kg;
p=1.2, 1.7, 2.1, 2.5, 3.0 bar.

In the simulations, it was considered a tire travelling in a straight line at a speed of 100 km/h in free rolling conditions (that is, in stationary rolling conditions) on a flat road. The quantities β and σ were determined from a curve of acceleration radial component. The quantity β was obtained by using a threshold whereas the quantity σ was obtained through an interpolation procedure using a Gaussian function, like the function $y_1$ shown in FIG. 3.

Once obtained the aforementioned values of the parameters $b_{ij}$, in order to evaluate the performance of the invention, the Applicant carried out FEA simulations in which the pressure and load values ($P_{est}$, $Fz_{est}$) were estimated by determining the quantities β and σ as just described and using the aforementioned functions (1) and (2).

The results of such simulations are shown in the table below, where: the first two columns indicate the known pressure and load reference values ($P_{ref}$ and $Fz_{ref}$), the third and the fourth column shown the estimated pressure and load values ($P_{est}$ and $Fz_{est}$) using the method of the invention and the last two columns indicate the difference (ΔP and ΔFz) between known reference values and estimated values.

| $P_{ref}$ [bar] | $Fz_{ref}$ [kg] | $P_{est}$ [bar] | $Fz_{est}$ [kg] | ΔP [bar] | ΔFz [kg] |
|---|---|---|---|---|---|
| 2.10 | 337 | 2.15 | 320 | −0.05 | 17 |
| 2.10 | 505 | 2.19 | 526 | −0.09 | −21 |
| 2.10 | 675 | 2.22 | 704 | −0.12 | −29 |
| 2.50 | 337 | 2.38 | 319 | 0.12 | 18 |
| 2.50 | 505 | 2.51 | 504 | −0.01 | 1 |
| 2.50 | 675 | 2.53 | 691 | −0.03 | −16 |
| 2.73 | 255 | 2.68 | 228 | 0.05 | 27 |
| 2.73 | 400 | 2.71 | 370 | 0.02 | 30 |
| 2.73 | 526 | 2.86 | 530 | −0.13 | −4 |
| 2.73 | 603 | 2.83 | 620 | −0.10 | −17 |
| 2.73 | 880 | 2.75 | 895 | −0.02 | −15 |
| 3.00 | 337 | 2.77 | 304 | 0.23 | 33 |
| 3.00 | 505 | 2.95 | 502 | 0.05 | 3 |
| 3.00 | 675 | 3.10 | 686 | −0.10 | −11 |

As evident from the results of the simulations, the method of the invention enables to estimate the inflation pressure and the load acting on the tire with good approximation.

The invention claimed is:

1. A method of operating a vehicle comprising a tire, the method comprising:
rotating the tire on a rolling surface to cause deformation of the tire on the rolling surface;
detecting, with a monitoring device fixed to a crown portion of the tire, data representative of the deformation undergone by the tire on the rolling surface;
receiving the detected data at one or more processing units included within at least one of the monitoring device or an electronic device located on board the vehicle;
analyzing, with the one or more processing units, the detected data in order to obtain a first quantity determined as one of a first angular extent of a first deformation region of the tire, or a length of a cord subtended by said first angular extent, or a length of an arc subtended by said first angular extent, wherein the first deformation region corresponds to a footprint between the tire and the rolling surface, and a second quantity determined as one of a second angular extent of a second deformation region of the tire, or a length of a cord subtended by said second angular extent, or a length of an arc subtended by said second angular extent, wherein said second deformation region comprises the first deformation region and the second angular extent is greater than the first angular extent, the second quantity obtained starting from at least a part of the detected data, which corresponds to a portion of said second deformation region which is external to the footprint; and determining, with the one or more processing units, a load acting on the tire on the basis of the first quantity and the second quantity thus obtained.

2. The method according to claim 1, wherein the first quantity is representative of the circumferential extension of said first deformation region.

3. The method according to claim 1, wherein the first quantity is representative of a change of position undergone within the footprint by a prefixed crown portion, with respect to a predetermined point of reference.

4. The method according to claim 1, wherein the second quantity is representative of the circumferential extension of said second deformation region.

5. The method according to claim 1, wherein the data representative of said deformation are selected from data representative of an acceleration component to which a prefixed crown portion is subjected, data representative of a speed component of the prefixed crown portion and data representative of a change of position of the prefixed crown portion with respect to a predetermined point of reference.

6. The method according to claim 1, wherein tire inflation pressure data are not used in the estimate of the load based on the first quantity and on the second quantity.

7. The method according to claim 1, wherein the first quantity and the second quantity are obtained based on analysis of a curve of the data representative of deformation,
wherein the curve includes a region with a substantially constant pattern and a region with a variable pattern;
wherein the region with the variable pattern includes a portion with a greatest variation from the substantially constant pattern; and
wherein the portion with the greatest variation from the substantially constant pattern represents the first deformation region.

8. The method according to claim 1, wherein the load acting on the tire is estimated by a Fourier development of the first quantity and the second quantity.

9. The method according to claim 1, wherein the first quantity and the second quantity are obtained based on analysis of a curve of the data representative of deformation, by setting thresholds and calculating the distance between points at which the curve crosses the set thresholds.

10. The method according to claim 1, wherein the first quantity and the second quantity are obtained by an interpolation procedure that uses parametric functions of the type:

$$f = f(\theta | p_1 \ldots p_n)$$

wherein $\theta$ represents an angular position $\theta$ of the crown portion of the tire during a complete tire revolution and $p_1 \ldots p_n$ are parameters at least one of which is the first quantity or the second quantity.

11. The method of claim 1, wherein the first and second quantities, in different load and inflation pressure conditions are not directly proportional to one another.

12. A vehicle, comprising:
a tire that undergoes deformation as the vehicle travels on a rolling surface;
a monitoring device fixed to a crown portion of the tire; and
one or more processing units included within at least one of the monitoring device or an electronic device located on board the vehicle and adapted to:
cooperate and interact with the monitoring device;
detect, with the monitoring device, data representative of the deformation undergone by the tire on the rolling surface;
analyze, with the one or more processing units, the detected data in order to obtain a first quantity determined as one of a first angular extent of a first deformation region of the tire, or a length of a cord subtended by said first angular extent, or a length of an arc subtended by said first angular extent, the first deformation region corresponding to a footprint between the tire and the rolling surface, and a second quantity determined as one of a second angular extent of a second deformation region of the tire, or a length of a cord subtended by said second angular extent, or a length of an arc subtended by said second angular extent, wherein said second deformation region comprises the first deformation region and the second angular extent is greater than the first angular extent, the second quantity being obtained starting from at least a part of the detected data, which corresponds to a portion of said second deformation region which is external to the footprint; and
determine, with the one or more processing units, a load acting on the tire on the basis of the first quantity and the second quantity thus obtained.

13. The vehicle according to claim 12, wherein the monitoring device is devoid of a direct pressure sensor.

14. The vehicle according to claim 12, wherein the monitoring device is arranged at an equatorial plane of the tire.

15. The vehicle according to claim 12, wherein the monitoring device comprises a sensor capable of being adapted to obtain said data representative of said deformation.

16. The vehicle according to claim 15, wherein said sensor is an accelerometer fixed on the crown portion of the tire.

17. The vehicle according to claim 15, wherein said sensor is capable of being adapted to determine a position of a prefixed crown portion with respect to a predetermined point of reference.

18. The vehicle according to claim 12, wherein said system comprises only one monitoring device operatively associated with the tire.

19. The vehicle according to claim 12, wherein the first quantity and the second quantity are obtained based on analysis of a curve of the data representative of deformation,
wherein the curve includes a region with a substantially constant pattern and a region with a variable pattern;
wherein the region with the variable pattern includes a portion with a greatest variation from the substantially constant pattern; and
wherein the portion with the greatest variation from the substantially constant pattern represents the first deformation region.

20. The vehicle according to claim 12, wherein the load acting on the tire is estimated by a Fourier development of the first quantity and the second quantity.

21. The vehicle according to claim 12, wherein the first quantity and the second quantity are obtained based on analysis of a curve of the data representative of deformation, by setting thresholds and calculating the distance between points at which the curve crosses the set thresholds.

22. The vehicle according to claim 12, wherein the first quantity and the second quantity are obtained by an interpolation procedure that uses parametric functions of the type:

$$f=f(\theta|p_1 \ldots p_n)$$

wherein $\theta$ represents an angular position $\theta$ of the crown portion of the tire during a complete tire revolution and $p_1 \ldots p_n$ are parameters at least one of which is the first quantity or the second quantity.

* * * * *